United States Patent [19]
Isaksson et al.

[11] Patent Number: 5,453,108
[45] Date of Patent: Sep. 26, 1995

[54] APPARATUS FOR FILTERING GASES

[75] Inventors: Juhani Isaksson, Karhula, Finland; Reijo J. Kuivalainen, San Diego, Calif.

[73] Assignee: A. Ahlstrom Corporation, Noormarkku, Finland

[21] Appl. No.: 246,223

[22] Filed: May 18, 1994

[51] Int. Cl.[6] .............................. B01D 29/66; B01D 39/20
[52] U.S. Cl. ................. 55/302; 55/341.1; 55/523
[58] Field of Search .................... 95/273, 280, 285; 55/267, 269, 284, 302, 341.1–341.7, 523

[56] References Cited

U.S. PATENT DOCUMENTS

| | | | |
|---|---|---|---|
| 3,951,627 | 4/1976 | Barr, Jr. et al. | 55/284 |
| 4,343,631 | 8/1982 | Ciliberti | 55/302 |
| 4,427,423 | 1/1984 | Montierth | 55/523 X |
| 4,525,184 | 6/1985 | Tassicker | 55/302 |
| 4,813,231 | 3/1989 | Bykowski | 55/523 X |
| 4,869,207 | 9/1989 | Engström et al. | 55/269 X |
| 4,904,287 | 2/1990 | Lippert et al. | 55/302 |
| 4,973,459 | 11/1990 | Lippert et al. | 55/302 X |
| 5,013,341 | 5/1991 | Isaksson et al. | 55/302 |
| 5,037,461 | 8/1991 | Zievers et al. | 55/523 X |
| 5,059,227 | 10/1991 | Kilicaslan et al. | 55/523 X |
| 5,078,760 | 1/1992 | Haldipur et al. | 55/302 X |
| 5,085,266 | 2/1992 | Arold et al. | 55/267 X |
| 5,094,673 | 3/1992 | Kilicaslan et al. | 55/302 |
| 5,114,581 | 5/1992 | Goldsmith et al. | 55/523 X |
| 5,254,144 | 10/1993 | Provol | 55/302 X |
| 5,282,877 | 2/1994 | Unger et al. | 55/523 X |
| 5,284,498 | 2/1994 | Davis et al. | 55/269 |
| 5,318,755 | 6/1994 | Kuivalainen et al. | 55/523 X |
| 5,338,326 | 8/1994 | Jelich et al. | 55/302 X |
| 5,346,533 | 9/1994 | Jelich et al. | 55/302 X |
| 5,348,568 | 9/1994 | Oda et al. | 55/302 X |
| 5,348,572 | 9/1994 | Jelich et al. | 55/302 X |

Primary Examiner—Robert Spitzer
Attorney, Agent, or Firm—Nixon & Vanderhye

[57] ABSTRACT

Filtering apparatus for filtering particles from high temperature (e.g. greater than 500 degrees C., and at a pressure of about 2–40 bar) gases includes a hollow upright vessel with at least one generally torodial shaped hollow clean gas chamber mounted within it. The gas chamber has a gas impervious peripheral wall with at least one ceramic or sintered metal filter mounted in an opening in the wall. Dirty gas flows through the filter(s) into the clean gas chamber, and then passes through a conduit to be ultimately discharged from the vessel. The torodial shaped chamber may be circular or polygonal (e.g. square) in plan, and circular or polygonal in cross-section; for example it can be constructed solely of flat plates.

21 Claims, 4 Drawing Sheets

APPARATUS FOR FILTERING GASES

BACKGROUND AND SUMMARY OF THE INVENTION

This invention relates to an apparatus for filtering high temperature gases, such as high temperature high pressure gases containing solid contaminants entrained therein and being discharged from a circulating fluidized bed reactor. The filtration apparatus typically comprises porous monolithic ceramic filter elements or the like. The present invention also relates to an apparatus for efficiently removing accumulated solids from the filtering elements in a safe manner.

It is known in the prior art to use ceramic filters, in order to remove particulates from hot gas streams. It is e.g. known to use candle type ceramic filters (as shown in U.S. Pat. No. 4,869,207) supported by a tube sheet for cleaning hot gases. The size of the filter housing is however presently limited, the practical limit for the diameter of a pressure vessel with candle type filter being about 2–5 m.

It has also been suggested to utilize monolithic ceramic filters, having e.g. a plurality of passageways extending longitudinally from inlet end to outlet end, but being plugged to prevent direct passage of the feed stock through the passageways from the inlet face to the outlet face. The cleaning capacity of clusters of such monolithic ceramic filters is much higher than of conventional candle type or tubular ceramic filters. The monolithic ceramic filters thereby being less space consuming than conventional tubular or candle type ceramic filters. The mounting of these elements in filtration vessels in high temperature surroundings and possible temperature variations has however led to very complicated constructions.

It is also known that it is essential to have the filters cleaned, e.g. after certain pre-determined operating periods, in order to be able to maintain the desired pressure drop. Commonly used methods of cleaning the filter employ a reverse directional pulse of gas for flushing the filter. This kind of method is disclosed e.g. in U.S. Pat. No. 5,284,498 showing in a filtration vessel a single integral inner shell provided with ceramic monolithic filter elements for passing clean gas from the inner dirty gas side of the inner shell to the outer annular clean gas side of the shell. A back pulsing nozzle for back pulsing cleaning gas is provided in front of each monolithic filter element.

It is an object of the present invention to provide an improved apparatus for filtering high temperature gases. It is especially an object of the present invention to provide a new way of arranging porous monolithic ceramic filters in a filtration vessel.

According to one embodiment of the present invention, an apparatus for filtering high temperature gases both from pressurized (i.e. superatmospheric pressure) systems and atmospheric systems, is provided. The filtration apparatus comprises following elements:

a hollow vessel having an inlet for dirty gas containing solid contaminants to be filtered therefrom, an outlet for clean gas and an outlet for particles filtered from the gas. shaped (i.e. torodial hollow clean gas chamber disposed in a dirty gas volume in the hollow vessel, the clean gas chamber having a generally impervious peripheral wall preventing dirty gas from flowing from the dirty gas volume through said wall into the clean gas chamber, at least one porous ceramic filter element disposed in an opening in the peripheral wall of the clean gas chamber, allowing filtered clean gas to flow from the dirty gas volume through the filter element into said clean gas chamber, and means for discharging clean gas from the clean gas chamber to the exterior of the hollow vessel.

The apparatus according to the present invention may advantageously utilize monolithic ceramic filter elements, such as CeraMem™ filters as shown in U.S. Pat. No. 5,114,581 or cross flow filters as shown in U.S. Pat. No. 5,078,760, the disclosures of which are incorporated by reference herein. CeraMem™ filter elements are typically cylindrical having several parallel longitudinal passageways therethrough, the passageways being plugged to prevent dirty gas from flowing directly through a passageway connected with the dirty gas side and forcing clean gas to flow through the porous ceramic material into an adjacent passageway connected with the clean gas side. Cross flow ceramic filter elements being e.g. formed of several ceramic ribbed sheets forming crosswise clean and dirty gas channels. In general, the filter elements may be constructed and mounted as in copending application Ser. No. 08/246,221 filed May 18, 1994, the disclosure of which is hereby incorporated by reference herein.

According to a preferred embodiment of the present invention, there is a generally upright hollow pressure vessel having a top, side walls and a bottom. In the vessel two or more generally torodial or doughnut shaped clean gas chambers are disposed concentrically one on top of the other spaced vertically from each other. An inlet for dirty volume is disposed in the top of the vessel generally concentrically with the doughnut shaped clean gas chambers.

Each clean gas chamber is preferably made of an elongated hollow open ended tubular element bent into a ring shaped form. The tubular element preferably has a circular cross section. The tubular element may alternatively have a semicircular, square or polygonal cross section if desired. Both ends of the tubular element are connected to each other in a gas tight joint, thereby forming a torodial chamber. The two or more doughnut shaped clean gas chambers disposed on top of each other in the vessel preferably have the same diameter and cross sectional dimensions, but may if desired have different diameters and/or dimensions.

Polygonal (e.g. square) or semicircular cross section clean gas chambers may be used instead of circular cross section clean gas chambers. In polygonal or square cross section and plan view clean gas chambers the peripheral walls of the clean gas chambers may be made of straight plate material, which in some cases is an advantage.

According to a preferred embodiment of the present invention the monolithic ceramic elements are mounted in openings provided in the peripheral wall of each clean gas chamber. The filter elements may be mounted in a row or in some other configuration one after the other on the inner, outer, top or bottom peripheral wall or walls of a ring shaped clean gas chamber. The filter elements may if desired be mounted simultaneously at different sides of the clean gas chamber. The filter elements may i.e. be arranged in zig-zag form, in turns on opposite sides of the clean gas chamber, the filters overlapping each other therein. In clean gas chambers having a semicircular peripheral cross section, i.e. having one straight side and one generally semicircular side, the ceramic filter elements are easily connected to openings on the straight side. The clean gas chambers may have partition walls therein.

The clean gas chamber may have a rather small cross sectional diameter, as long as it is possible to insert the ceramic filter elements into openings made on the peripheral walls thereof.

The porous ceramic filter elements, being e.g. cylindrical in form and having one inlet (dirty) end and one outlet (clean) end, may in some cleaning processes protrude with their clean and relatively deep into the tubular elements, such that the ceramic element may cover >½, or even more of the cross sectional inner area of the clean gas chamber. The clean gas chambers need enough free inner space for clean gas to be able to pass the filter elements therein and flow freely into a clean gas discharge conduit. A very compact filter module, clean gas chamber with filter elements, is provided if the filter elements are arranged on the inner peripheral wall of the clean gas chamber.

Also, other advantages are achieved, especially when cleaning the ceramic filters by back pulsing, when the filter elements are disposed with their clean ends protruding rather deep, e.g. >½ of them, into the tubular elements. Cleaning of monolithic ceramic filter elements in an apparatus according to the present invention may be made in a conventional manner e.g. as has been suggested for different candle type filters, by injecting clean gas or air into the clean gas chamber. The high pressure cleaning pulse thereby compresses the portions of the ceramic filter elements being inside the clean gas chamber from all sides, preventing mechanical breaking of the filter elements.

According to a preferred embodiment of the present invention a clean gas outlet conduit is connected to each clean gas chamber, the clean gas outlet conduit being arranged to lead clean gas from the chamber to the exterior of said hollow vessel.

According to another preferred embodiment of the present invention a connecting duct is arranged between different clean gas chambers, not all having outlet conduits connected to them, for allowing clean gas to flow from one chamber to another and ultimately to one or a few clean gas chambers having a clean gas outlet conduit connected to them. Clean gas chambers in the upper part of the hollow vessel preferably have outlet conduits leading through the top of said hollow vessel, whereas outlet conduits in the lower part lead through the bottom of the vessel.

A vertical outlet conduit from a clean gas chamber passing other clean gas chambers may be arranged to pass these clean gas chambers mainly in the middle part of the vessel i.e. in the central opening of those doughnut shaped clean gas chambers.

Several clean gas outlet conduits may be connected to each clean gas chamber, for discharging clean gas and simultaneously supporting said clean gas chambers within the filtration vessel. Alternatively each clean gas chamber may be connected by supporting bars to the filtration vessel construction.

Separate means for introducing a pulse of cleaning gas into the clean gas chambers, for back pulsing filter elements disposed in openings therein and dislodging particles which have collected on said filter elements, may be provided in each clean gas chamber. A clean gas chamber may if desired be divided into sections, such that different sections are back pulsed separately, at the same moment or at different moments. Thereby the clean gas chamber may be divided into sections by partition walls therein.

The back pulsing of the filter elements is performed so that particles fall down into the bottom of said vessel and are discharged through an outlet therein. The means for introducing a back pulse may alternatively by connected to the clean gas outlet conduits connected to the clean gas chambers, especially if a separate clean gas outlet conduit is provided in each clean gas chamber.

The present new filtration apparatus is especially suitable for cleaning dirty gases in a system comprising a pressurized fluidized bed reactor discharging gases with entrained particles and at a temperature of between about 500°–1200° C., and at a pressure of between about 2–40 bar.

Dirty gas, such as process gas from a combustor or gasifier, introduced centrally into the vessel through an inlet in the top thereof is easily distributed from the middle of the vessel evenly to all filter elements disposed in doughnut shaped chambers. In the vessel the dirty gas flows downwardly and simultaneously radially outwardly.

Downward flow of gas is also advantageous when considering back pulsing of the filters. Solid particulates dislodged by back pulsing is guided downward with the dirty gas toward the solid particulate outlet.

If desired it is also in a filtration vessel according to the present invention easy to guide the incoming flow of dirty gas to the periphery immediately in the top of the vessel and to guide the flow from the upper part of the vessel evenly downward adjacent the side walls of the vessel on the outside periphery of the doughnut shaped clean gas chambers. The dirty gas then flows downward along the vessel and simultaneously radially inwardly toward the filter elements. If desired the inlet of dirty gas may be arranged in a side wall of the filtration vessel.

One of the main advantages provided by a filtration apparatus according to the present invention is a symmetrical heat expansion of the doughnut shaped clean gas chambers, which minimizes many problems normally arising in filtration vessels due to changes in temperature.

One further advantage achieved with the present invention is a simple and minimal space consuming construction of a doughnut or ring shaped clean gas chamber in a circular pressure vessel.

DETAILED DESCRIPTION OF THE DRAWINGS

Figure 1:
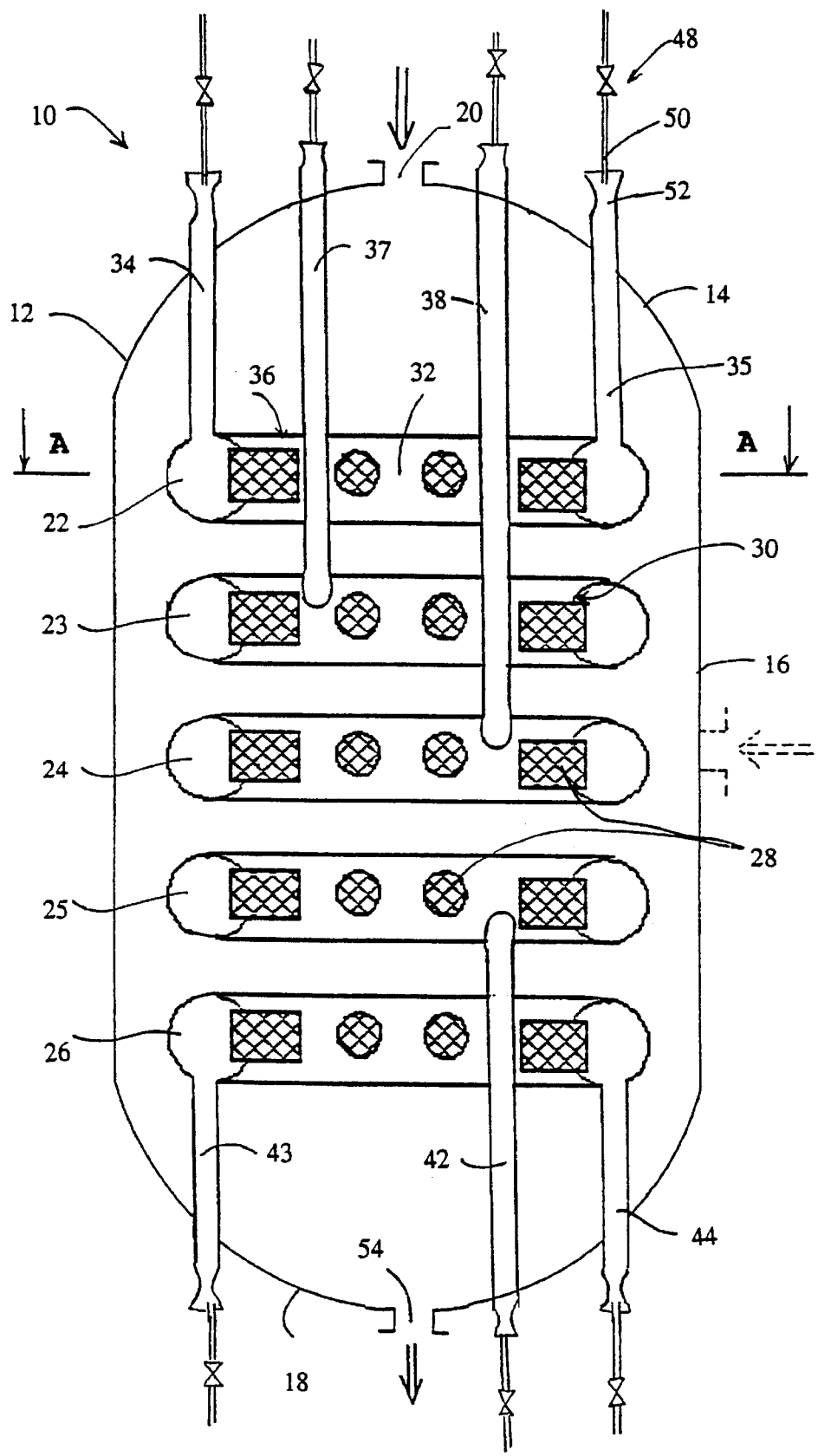
FIG. 1 is a schematic side cross-sectional view of an exemplary filtration apparatus according to the present invention.

An exemplary filter assembly for high temperature gases is shown generally by reference numeral 10 in FIG. 1. It includes a generally upright hollow filtration vessel 12 having a top 14, side wall 16 and bottom 18. In the top 14 is a gas inlet 20 for particle laden high temperature dirty gas. An alternative inlet in the side wall is shown as 20'. The inlet can be connected to a fluidized bed combustor, gasifier or the like.

Several generally horizontal doughnut shaped clean gas chambers 22, 23, 24, 25 and 26, are provided concentrically one on top of the other in the vessel 12. The clean gas chambers have a circular cross section. Monolithic porous ceramic filter elements 28 are disposed in openings 30 in the inner peripheral wall 32 of the clean gas chambers.

Vertical clean gas outlet conduits 34 and 35 are connected to the top side 36 of the clean gas chamber 22. The conduits 34 protrude through the top 14 of the vessel 12, into the exterior side of the vessel. Outlet conduits 37, 37' and 38, 38' are connected to clean gas chambers 23 and 24. The conduits 37,38 are connected to the inner peripheral wall 32 of the clean gas chambers. The conduit 37 is in its lower end directed toward the middle of the vessel and in its upper end mainly vertical, such that it passes the ring shaped clean gas chamber 22 in the central opening 40 (FIG. 2) thereof. Conduit 38 is constructed in a similar manner to be able to pass clean gas chambers 22 and 23 in their central openings. An outlet conduit 42 is connected to clean gas chamber 25 and conduits 43,44 to clean gas chamber 26 in a similar manner but directed downward to protrude the bottom of vessel 12. These conduits 43,43,44 may be, if desired, directed upward as conduits 37 and 38.

The clean gas conduits 37, 38 and 42 may be connected to the outer periphery of the clean gas chambers and directed to pass other ring shaped clean gas chambers on the outer side of them.

Clean gas chambers 23, 24 and 25 preferably also have at least two clean gas conduits, even if only one is shown in FIG. 1. In some filtration apparatuses only one clean gas conduit may be enough for discharging clean gas from each clean gas chamber, whereas in some systems more than two conduits may be needed for each clean gas chamber. The clean gas conduits may be constructed to simultaneously support the clean gas chambers in the vessel.

Further means 48 for back pulsing the filter elements in the clean gas chambers may be provided at each or at desired outlet conduits. Back pulsing is provided by a gas injecting nozzle 50 disposed in a venturi shaped outlet portion 52 of the outlet conduits. Back pulsing is performed at intervals preferably at different moments in different clean gas chambers. Solid particulates dislodged from the filters falls down to the bottom 18 of the vessel 12 and is discharged through outlet opening 54.

Figure 2:
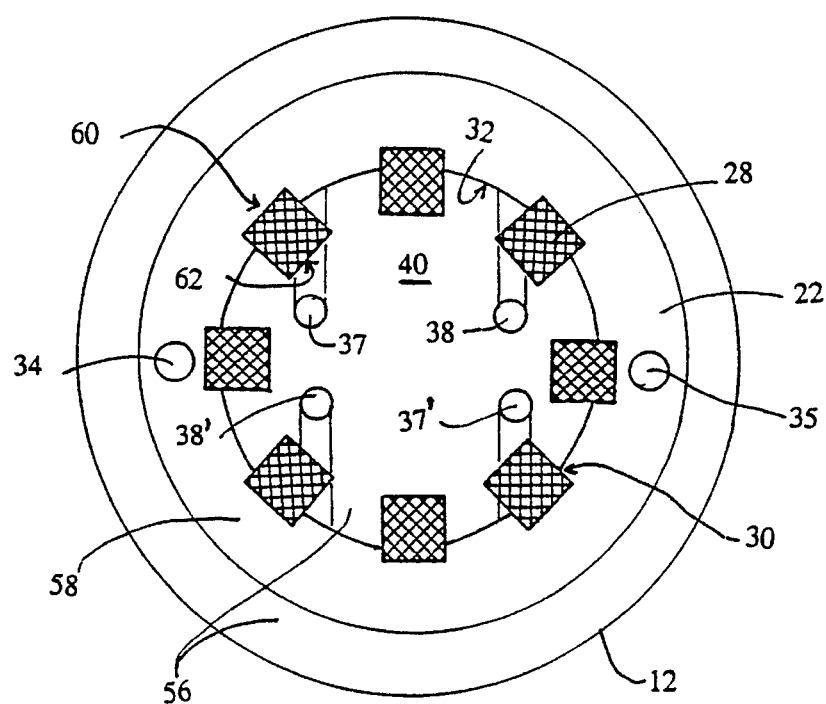
FIG. 2 is a horizontal cross-sectional view taken along line AA of the filtration apparatus in FIG. 1.

FIG. 2 shows that filter elements are connected to a row of openings 30 in the inner peripheral wall 32 of the clean gas chamber 22 for allowing only clean gas to flow from the dirty gas space 56 in the vessel to flow into the clean gas space 58 in the interior of the clean gas chamber 22. Each opening 30 in the wall 32 is adapted to receive a filter element 28, the clean gas side 60 of the filter element protruding into the clean gas space 58. The filter elements 28 are mainly cylindrical elements disposed radially with their dirty side 62 protruding inwardly towards the dirty gas space 56 in the middle of the opening 40 of the doughnut shaped clean gas chamber 22. The filter elements 28 are gastightly joined with the inner peripheral wall 32 of the clean gas chamber. The ceramic filter elements 28 are preferably protected by a metal sleeve not shown in the drawing. The sleeve is e.g. shrunk around the ceramic filter element and welded gas tight at points to the opening 30 in the wall 32. A heat transfer insulation and/or a sealing may be provided between the sleeve and the ceramic filter element if necessary. Particles separated from the dirty particle laden gas are accumulated on the surface of the dirty side 62 of the filter elements 28.

The monolithic ceramic filter elements 28, may protrude more than half their length into the clean gas chamber 22. The filter elements 28 protruding deep into the hollow clean gas chamber 22 prevents the filter elements from breaking even at high pressure back pulsing, as back pulsing pressure will compress the portion of the filter element being within the clean gas chamber at all sides and thereby e.g. prevent different ceramic layers from being separated from each other.

Figure 3:
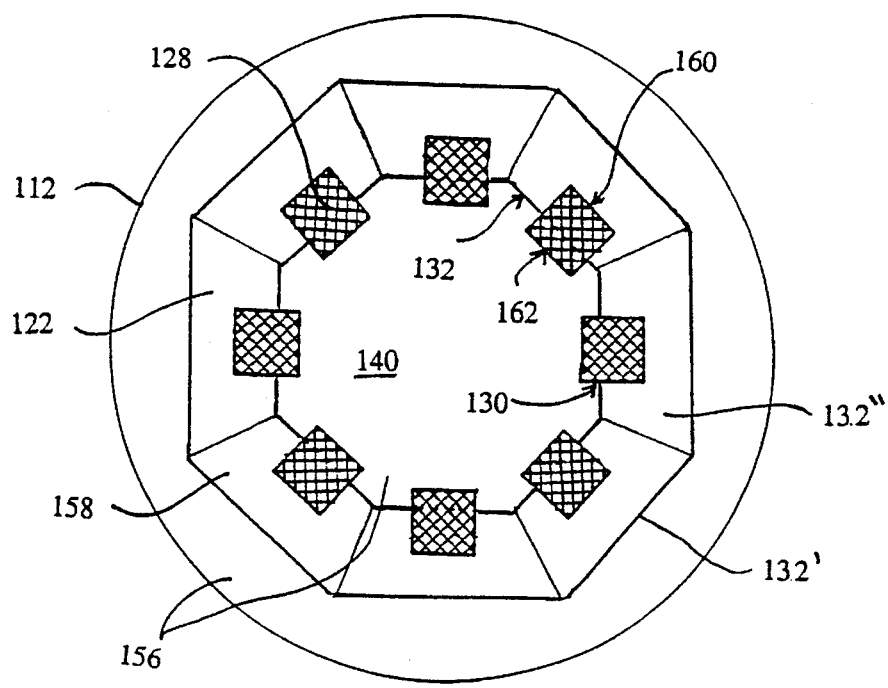
FIGS. 3 and 4 are horizontal cross-sectional views similar to FIG. 2 of other filtration apparatuses according to the present invention.

FIG. 3 shows a cross section of a filtration vessel according to another embodiment of the present invention. In FIG. 3 components comparable to those in FIGS. 1 and 2 embodiment are shown by the same reference numeral only preceded by a "1". In a vessel 112 is disposed a clean gas chamber 122 having several filter elements 128 connected to the inner peripheral wall 132 thereof. The horizontal cross section of clean gas chamber 122 is polygonal and not circular as shown in FIG. 2. The polygonally doughnut shaped clean gas chamber 122 can be fabricated of plane metal plates forming inner peripheral wall 132, outer peripheral wall 132' and top (not shown) and bottom peripheral wall 132". The metal plates forming the clean gas chamber are combined by e.g. welding and/or bent in desired shapes to form a gas tight clean gas chamber.

Figure 4:
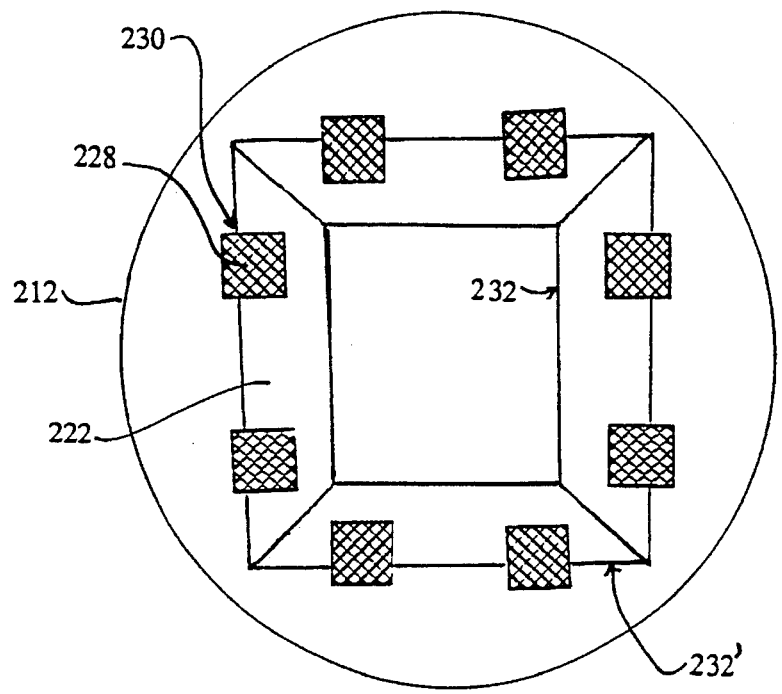

FIG. 4 shows a cross section of a filtration vessel according to another embodiment of the present invention. In FIG. 4 components comparable to those in FIGS. 1 and 2 embodiment is shown by the same reference numeral only preceded by a "2". In a vessel 212 is disposed a clean gas chamber 222 having several filter elements 228 connected to the outer peripheral wall 232' thereof. The horizontal cross section of clean gas chamber 222 is square and not circular as shown in FIG. 2 or polygonal as shown in FIG. 3.

Figure 5:
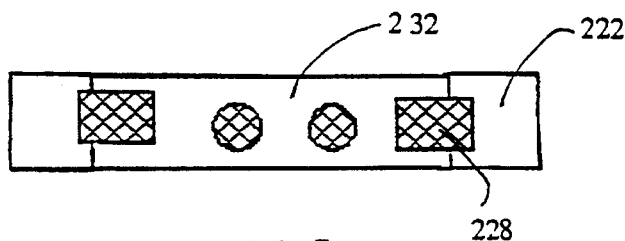
FIG. 5 shows a vertical cross sectional view taken along line BB of a clean gas chamber similar to that shown in FIG. 4, but with an alternative arrangement of filter elements.

FIG. 5 shows a vertical cross section of a clean gas chamber 222 similar to that shown in FIG. 4 taken along line BB, the cross section of the clean gas chamber square, but with an alternative arrangement of filter elements on the inner peripheral wall 232' of the clean gas chamber.

Figure 6:
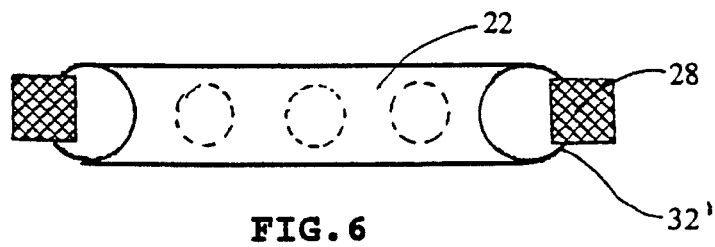
FIGS. 6 and 7 are side cross-sectional views of clean gas chambers like those shown in FIG. 1 of filtration apparatuses according to other embodiments of the present invention.
Figure 7:
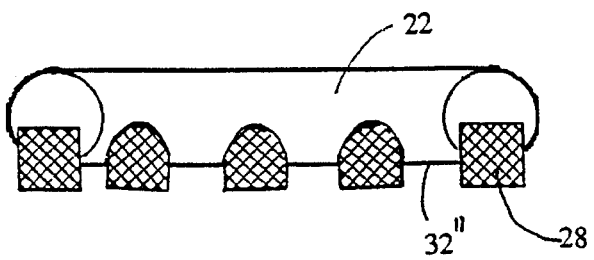

FIG. 6 shows a vertical cross sectional view of a clean gas chamber 22 having filter elements 28 arranged in openings on the outer and bottom peripheral wall thereof. FIG. 7 shows a vertical cross sectional view of still another clean gas chamber 22 having filter elements 28 arranged in openings in the bottom peripheral wall 32" thereof. Filter elements may of course if needed also be disposed in openings in the top peripheral wall.

Figure 8:
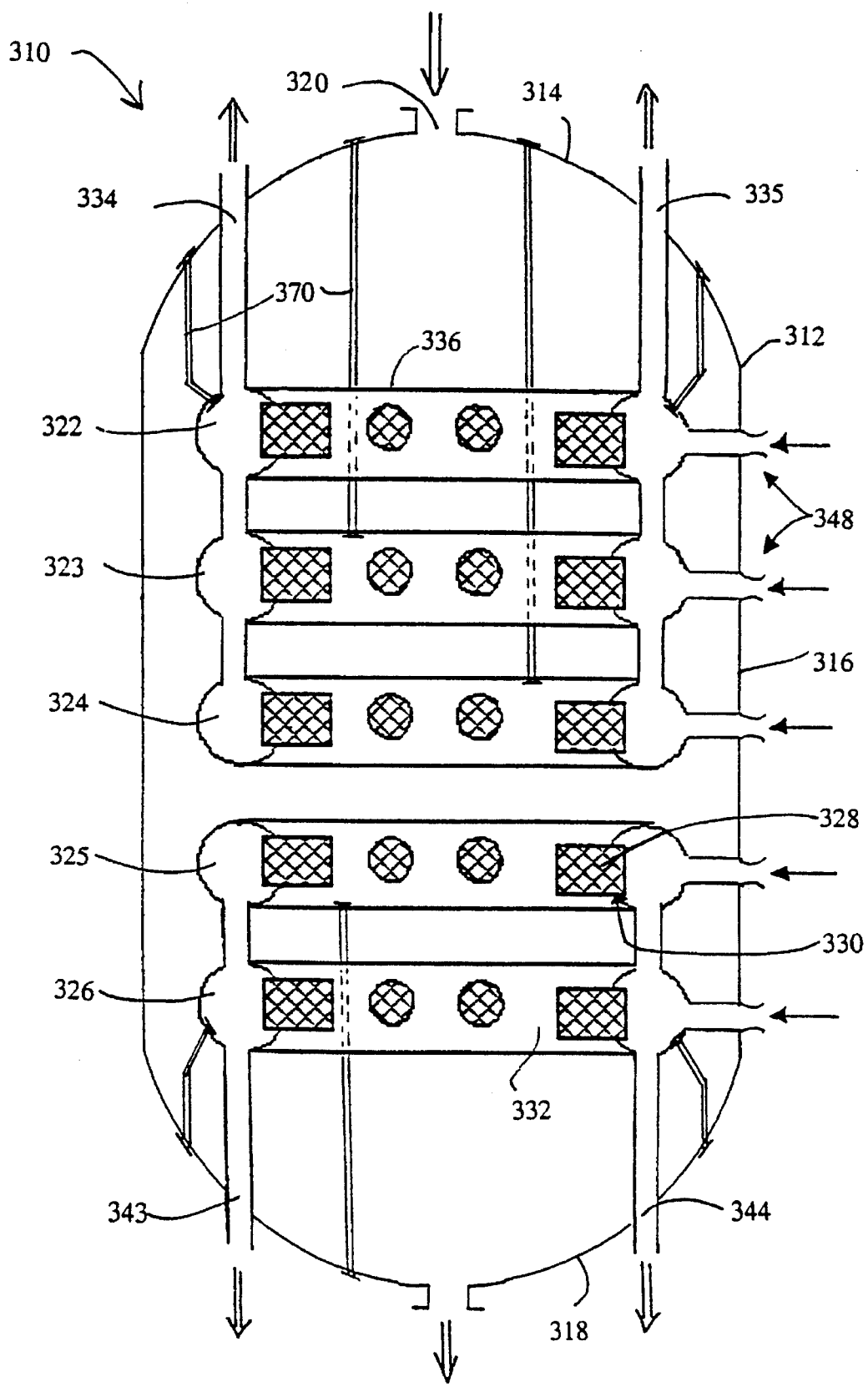
FIG. 8 is a schematic side cross-sectional view of another exemplary filtration apparatus according to the present invention.

FIG. 8 shows still another exemplary embodiment of the present invention. In FIG. 8 components comparable to those in the FIGS. 1 and 2 embodiment are shown by the same reference numeral only preceded by a "3". In this embodiment, also having a generally upright hollow filtration vessel 312 having a top 314, side wall 316 and bottom 318. In the top 314 is a gas inlet 320 for particle laden high temperature dirty gas.

Several generally horizontal doughnut shaped clean gas chambers 322, 323, 324, 325 and 326, are provided concentrically one on top of the other in the vessel 312.

The clean gas chambers have a circular cross section. Monolithic porous ceramic filter elements 328 are disposed in openings 330 in the inner peripheral wall 332 of the clean gas chambers.

Vertical clean gas outlet conduits 334, 335, 343 and 344 are connected to the top side 336 of the clean gas chamber 322 and to the bottom side 332" of the clean gas chamber 326. Clean gas chambers 323, 324 and 325 lack separate clean gas outlets, instead chambers 322 and 323 are connected by conduit 366 and chambers 323 and 324 by conduit 367 and chambers 325 and 326 by conduit 368, thereby allowing clean gas to flow from chambers 323 and 324 into chamber 322. Similarly chambers 325 and 326 are connected by conduit 368.

The clean gas chambers are in this filtration apparatus supported by separate supporting bars 370 connected with the top and bottom of the vessel. The supporting bars may be connected to the side wall 316 of the vessel if convenient.

In this filtration apparatus each clean gas chamber has its own back pulsing means 348 not directly connected with the clean gas outlet conduits.

While several exemplary embodiments of the invention are shown, it is to be understood that still other modifications are possible within the scope of the invention. For example the monolithic ceramic filter elements may have other forms than cylindrical described here. The filter elements may be additionally coated or otherwise combined with e.g. catalytic material for catalytic processing of flue gases passing the filter elements. Different parts of the filtration apparatus may be cooled as desired, to extend their lives, or for other reasons. The filtration vessel may be insulated in order to prevent gas from cooling if that is undesirable.

The construction of the filter elements 28, 128, etc. may take a wide variety of forms. For example they may be porous monolithic ceramic, ceramic honeycomb, ceramic candle, ceramic tube, or porous metallic (e.g. manufactured by sintering metals) filter elements.

While the invention has been herein shown and described in what is presently conceived to be the most practical and preferred embodiment thereof, it is to be understood that the claims are to be interpreted as broadly as allowed by the prior art so as to encompass all equivalent structures and devices.

We claim:

1. Gas filtering apparatus comprising:
   a hollow vessel having an inlet for dirty gas containing solid contaminants to be filtered therefrom, an outlet for clean gas, and an outlet for particles filtered from the gas;
   at least one generally horizontally mounted generally torodial shaped hollow clean gas chamber disposed in a dirty gas volume in said hollow vessel, said clean gas chamber having a generally gas-impervious peripheral wall preventing dirty gas from flowing from said dirty gas volume through said wall into said clean gas chamber;
   at least one porous filer element disposed in an opening in said peripheral wall of said clean gas chamber, for allowing filtered clean gas to flow from said dirty gas volume through said filter element into said clean gas chamber; and
   means for discharging clean gas from said clean gas chamber to the exterior of said hollow vessel.

2. Apparatus as recited in claim 1 wherein said hollow vessel is a generally upright vessel having a top, side walls, and a bottom; and wherein said inlet for dirty gas is provided in the top of said hollow generally upright vessel generally concentric with said generally torodial shaped clean gas chamber.

3. Apparatus as recited in claim 1 wherein said hollow vessel is a generally upright vessel; and wherein said at least one generally torodial shaped clean gas chamber comprises two or more concentric generally torodial shaped clean gas chambers each extending generally horizontally.

4. Apparatus as recited in claim 3 wherein at least two of said clean gas chambers have substantially the same horizontal dimensions and cross-sectional dimensions.

5. Apparatus as recited in claim 1 wherein said at least one clean gas chamber comprises a plurality of chambers; and wherein said chambers are generally tubular and are substantially circular in cross-section and in plan view.

6. Apparatus as recited in claim 1 wherein said at least one clean gas chamber comprises a plurality of chambers; and wherein said chambers are generally polygonal in cross-section and in plan view, being formed on flat plates.

7. Apparatus as recited in claim 1 wherein said at least one clean gas chamber comprises a plurality of chambers; and wherein said chambers are generally tubular and are circular in plan view and square in cross-section.

8. Gas filtering apparatus as recited in claim 1 wherein a clean gas outlet conduit is connected to said clean gas chamber, said clean gas outlet conduit mounted to lead to the exterior of said hollow vessel.

9. Apparatus as recited in claim 8 wherein said at least one clean gas chamber comprises a plurality of clean gas chambers, connected by a duct for allowing clean gas to flow from one chamber to the next, and ultimately to said clean gas outlet.

10. Apparatus as recited in claim 8 wherein said at least one clean gas chamber comprises a plurality of clean gas chambers, each separately connected to one or more clean gas outlets.

11. Apparatus as recited in claim 10 wherein said vessel is generally upright, having a top and a bottom, and some of said clean gas chambers provided in an upper part thereof, and some in a lower part thereof; and wherein chambers in said upper part are connected to clean gas outlets passing through said vessel top, and chambers in said lower part are connected to clean gas outlets passing through said vessel bottom.

12. Apparatus as recited in claim 1 wherein said at least one chamber comprises a plurality of chambers; and wherein said chambers are connected to said vessel by supporting bars.

13. Gas filtering apparats as recited in claim 1 wherein said at least one porous filter element comprises two or more filter elements which are disposed in openings in said peripheral wall of said clean gas chamber.

14. Gas filtering apparatus as recited in claim 13 wherein said filter elements are disposed in openings on an inner portion of said peripheral wall and are spaced from each other.

15. Gas filtering apparatus as recited in claim 13 wherein said filter elements are disposed in openings on an outer portion of said peripheral wall and are spaced from each other.

16. Gas filtering apparatus as recited in claim 13 wherein said chamber is defined by top and bottom walls, and both inner and outer peripheral walls; and wherein said filter elements are disposed in openings on the top or bottom or both peripheral walls and are spaced from each other.

17. Gas filtering apparatus as recited in claim 1 wherein said at least one filter element comprises a plurality of filter elements; and further including means for introducing a pulse of cleaning gas into said clean gas chamber for back pulsing said filter elements disposed in openings therein and dislodging particles which have collected on said filter elements, so that particles may fall down into the bottom of said vessel and pass through said outlet for particles.

18. Gas filtering apparatus as recited in claim 17 wherein said means for introducing a pulse of cleaning gas is connected to a clean gas outlet conduit connected to said clean gas chamber.

19. Apparatus as recited in claim 17 wherein said vessel is a generally upright vessel; and wherein said at least one chamber comprises a plurality of concentric chambers disposed one atop the other and spaced vertically to each other; and wherein at least two of said chambers are connected to each other by a conducting duct; and further comprising separate means for introducing a pulse of cleaning gas connected to each of said clean gas chambers.

20. Apparatus as recited in claim 1 in combination with a pressurized fluidized bed reactor having a discharge for gases with entrained particles therein at a temperature of between about 500°–1200 degrees C., and at a pressure of between about 2–40 bar, said discharge connected to said vessel dirty gas inlet.

21. Apparatus as recited in claim 1 wherein said at least one porous filter element comprises a plurality of monolithic ceramic, ceramic candle, ceramic tube, or sintered metallic filter elements, capable of filtering gases at temperatures of greater than 500 degrees C.

* * * * *